United States Patent
Niederberger

(10) Patent No.: US 6,170,550 B1
(45) Date of Patent: Jan. 9, 2001

(54) PRESSING DEVICE FOR WELDING SEALING WEBS

(75) Inventor: Adolf Markus Niederberger, Kägiswil (CH)

(73) Assignee: Leister Process Technologies (CH)

( * ) Notice: Under 35 U.S.C. 154(b), the term of this patent shall be extended for 0 days.

(21) Appl. No.: 09/243,951

(22) Filed: Feb. 3, 1999

(30) Foreign Application Priority Data

Jun. 2, 1998 (EP) .............................................. 98 102 043

(51) Int. Cl.⁷ .................................................... B32B 31/04
(52) U.S. Cl. ............................................ 156/544; 156/574
(58) Field of Search .................................. 156/157, 544, 156/555, 574, 579, 582

(56) References Cited

U.S. PATENT DOCUMENTS

| 4,447,288 | * | 5/1984 | Seaman | 156/574 |
| 4,504,352 | * | 3/1985 | Meyer | 156/499 |
| 4,834,828 | * | 5/1989 | Murphy | 156/359 |
| 5,051,148 | * | 9/1991 | Resch | 156/358 |
| 5,234,533 | * | 8/1993 | Neal | 156/497 |
| 5,865,942 | * | 2/1999 | Sinclair | 156/499 |
| 6,050,317 | * | 4/2000 | Weissfloch | 156/499 |

* cited by examiner

Primary Examiner—James Sells
(74) Attorney, Agent, or Firm—Bachman & LaPointe, P.C.

(57) ABSTRACT

An automatic welding machine for waterproof sheeting with a pressing device for pressing lap-welded materials, where the pressing device has at least one press roll which is mounted on a shaft that is secured and is provided with an elastic sheathing on the circumference as a press surface on the contact surface of the material. The press roll is mounted by a pendulum bearing on the shaft which is centered with respect to the outside edges of the press surface and permits an additional limited pendulum movement of the press roll with respect to the shaft. The press roll remains parallel to the running gear of the automatic welding machine, but it can execute a pendulum movement on the basis of irregularities in the substrate, so that the pressure remains essentially constant even if the automatic welding machine is arranged at an inclination. In addition, the proposed press roll can also be driven by providing a rotationally fixed entraining unit between a drive shaft and the press roll. The press roll can be assembled and disassembled easily. The arrangement of the press roll can also be implemented with a manual press roll.

6 Claims, 6 Drawing Sheets

PRESSING DEVICE FOR WELDING SEALING WEBS

Figure 1:
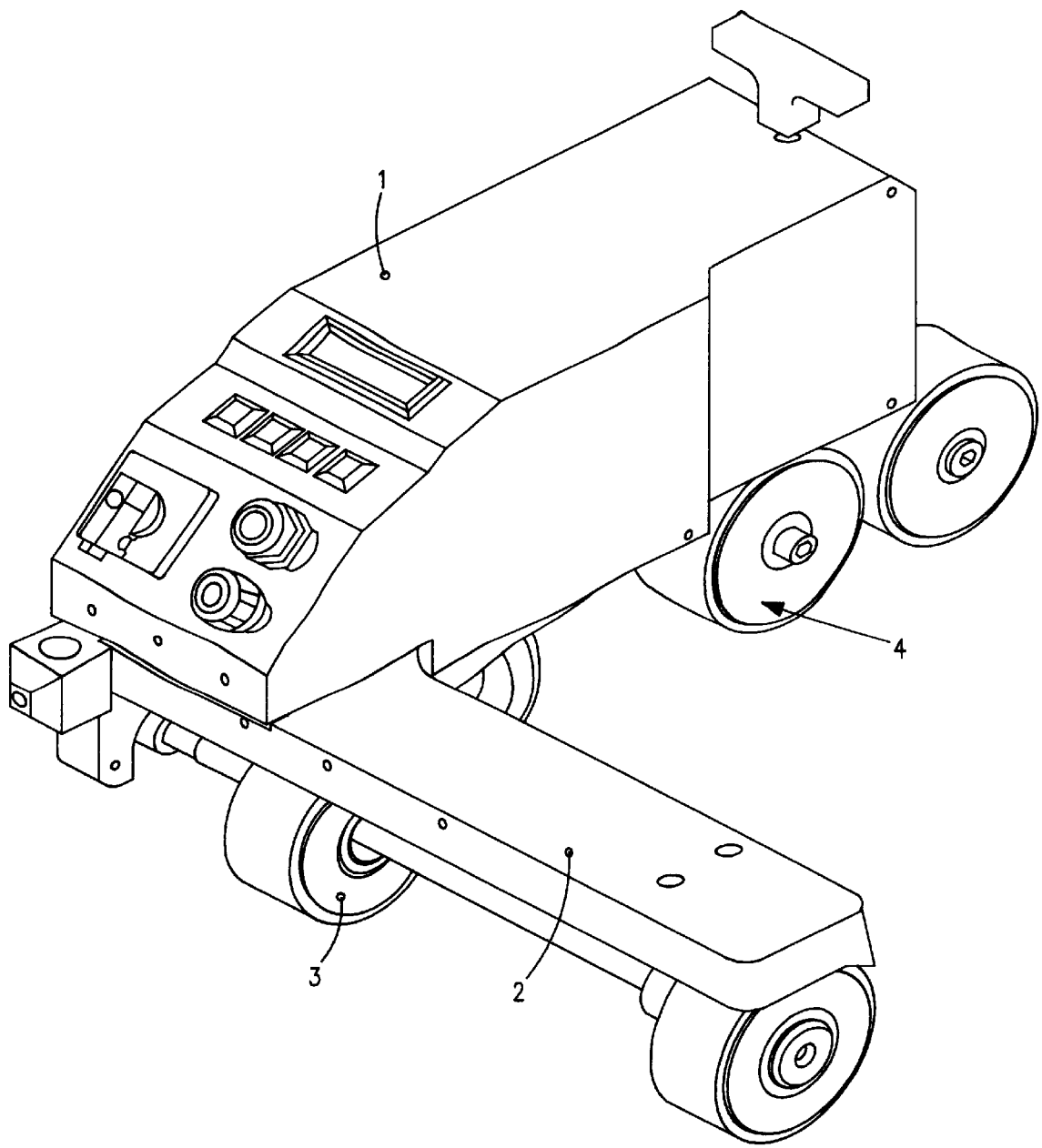

The present invention concerns an automatic welding machine for waterproof sheeting with a with a running gear with a welder mounted on it, guide rolls, a drive unit and pressing devices for the materials which are welded in a lap weld, said pressing devices having at least one press roll mounted on a shaft held by at least one lateral holder and having an elastic sheath on the periphery of the contact surface of the material as a pressure surface, compressing the fusion welding sheeting from above due to the weight of the automatic welding machine.

German Utility Model No. 9,110,488 U1 describes a device for lap welding of film edges, where the film is passed between two press rolls that are mounted so they can be pivoted about a pivot axis running horizontally and across the roll axis, to thereby equalize irregularities in levelness of the films. The required pressing pressure to be applied by the press rolls is generated by the press rolls themselves, not by the automatic welding machine.

To join and weld thermoplastic films, waterproof sheeting, tarpaulins and the like, the quality of the weld depends on the temperature, pressure and speed at which the welding operation is carried out. With the known automatic welding machines and their respective pressing devices, which generate the required pressing pressure on the weld from one side due to the weight of the automatic welding machine, one roll with a rigid shaft is used. If the substrate is uneven, the joining force of the automatic welding machine is transferred unevenly to the width of the weld and to the right and left of the test channel of the weld. There have been attempts to counteract this in practice by providing an additional soft elastic sheathing, e.g., made of rubber or silicone, around the metal press roll, to thereby compensate for such surface irregularities. Above a certain height of the irregularities, however, the press roll may still fail to exert pressure on the weld.

Therefore, the object of the present invention is to propose a possibility with which a uniform pressing pressure of the press rolls is nevertheless guaranteed even when there area surface irregularities.

Accordingly, the shaft is mounted on the running gear at one end and the press roll is mounted by a pendulum bearing on the shaft which is centered with respect to the outside edges of the press surface and permits an additional pendulum movement of the press roll with respect to the shaft since it can be pivoted about a pivot axis running parallel to the end face of the shaft, intersecting the axis of rotation at the mid point of its rotation. This type of joint in the form of a pendulum bearing permits a pendulum movement to equalize irregularities beneath the fusion welding sheeting while nevertheless guaranteeing a uniform pressure beyond equalizing the elastic sheathing. To guarantee a uniform distribution of forces over the entire press surface, the pendulum mount is centrally arranged at the mid point of rotation. The press roll is thus capable of changing its position relative to the shaft and adjusting to irregularities in the substrate accordingly. If a pressing device is used as a hand unit, the weight is nevertheless applied to the press surface centrally and in parallel with an oblique application of pressure. This greatly improves the quality of the weld even with these machines. In addition, elastic centering means are arranged on both sides of the pendulum bearing, serving as an elastic buffer and stop in the pendulum motion of the press roll and limiting the movement to a certain pendulum range of approximately ±4 degrees out of normal position. In addition, stabilization devices are provided between the running gear and the end face of the press roll to guide the press roll in parallel with the running gear. These prevent the press roll from assuming a control function with an automatic welding machine and deflecting the automatic welding machine away from the weld. This can be accomplished, for example, by means of ball bearings or other suitable means, so that the roll can execute the desired pivoting movement according to the substrate or the local irregularities, but it always runs straight relative to the running gear.

The elastic centering means are advantageously mounted on one end face by a bolt that secures the spring washer on the shaft. Thus, a press roll can be exchanged easily for another press roll of another width, especially with an automatic welding machine for waterproof sheeting.

According to another embodiment of this invention, the shaft can be driven and has an entraining sleeve which is joined in a form-fitting manner to the shaft and holds an entraining unit with a pendulum rolling behavior on the circumference. This design permits especially simple assembly and dismantling of the pressing device by pushing the individual parts axially onto the drive shaft and then securing them on the end of the shaft by means of a spring washer and a bolt.

The entraining unit according to another embodiment has an internal crown gear connected to the shaft and an external crown gear connected to the press roll, with at least the teeth of a crown gear being designed in a curved shape. The rotationally fixed entraining unit establishes the form-fitting connection between the shaft and the press roll and guarantees the pendulum movement of the press roll.

By means of this invention, it is thus possible with both an automatic welding machine as well as a manual press roll to ensure that the weight will nevertheless be applied centrally and in parallel to the press surface of the press roll when pressure is applied obliquely. In addition, the press roll can be replaced easily by another press roll, for example, one with a different width.

Figure 2:
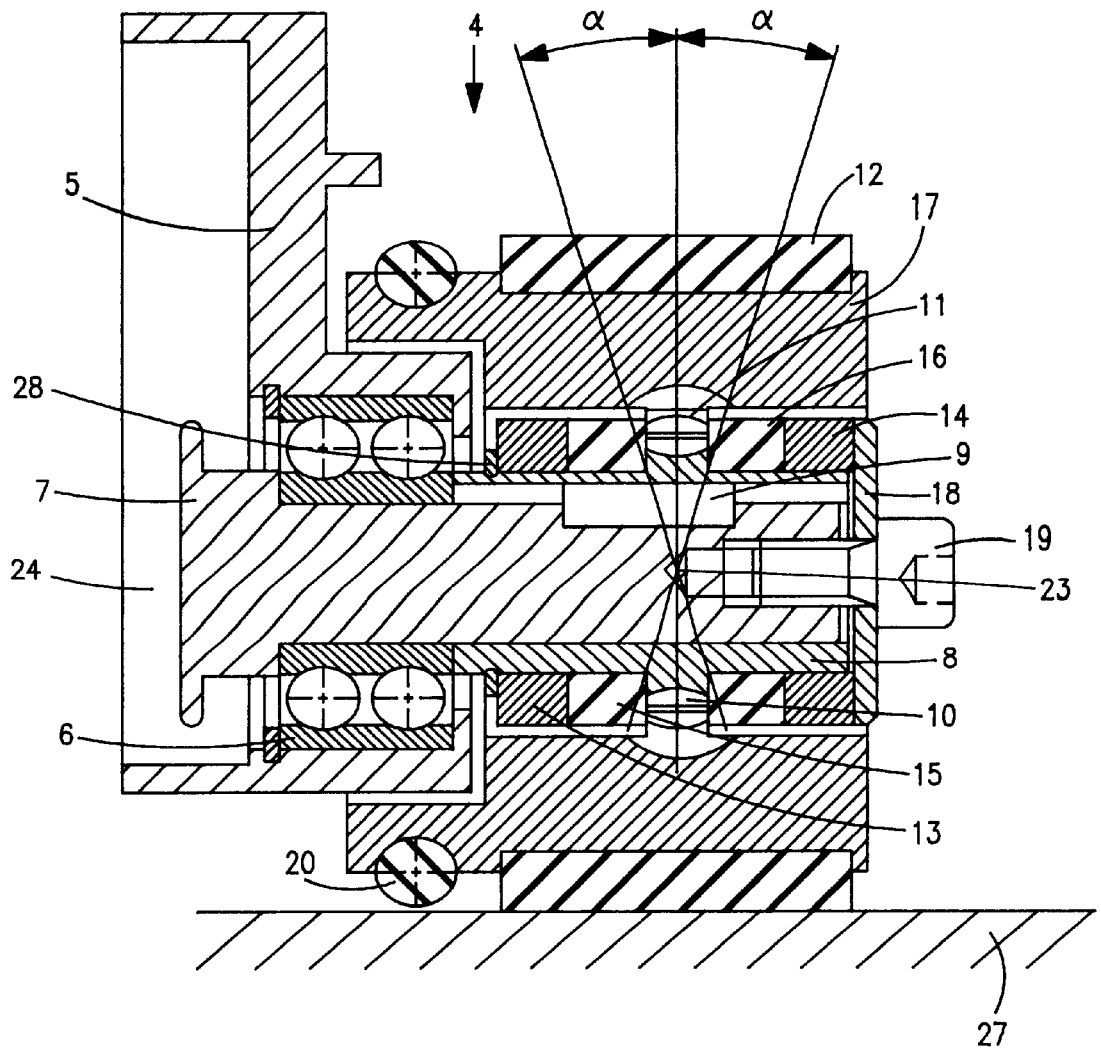
Figure 3:
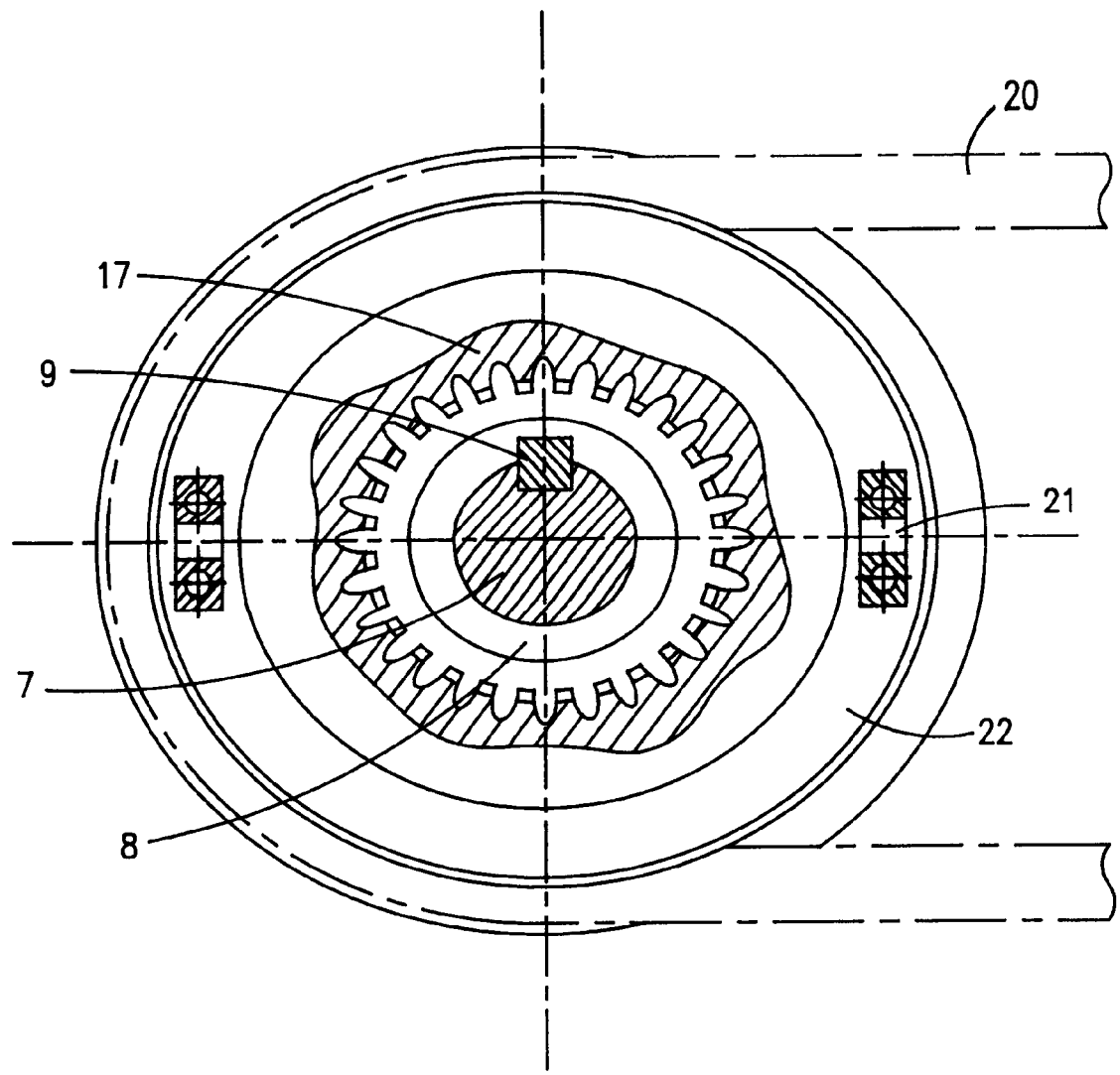
Figure 4:
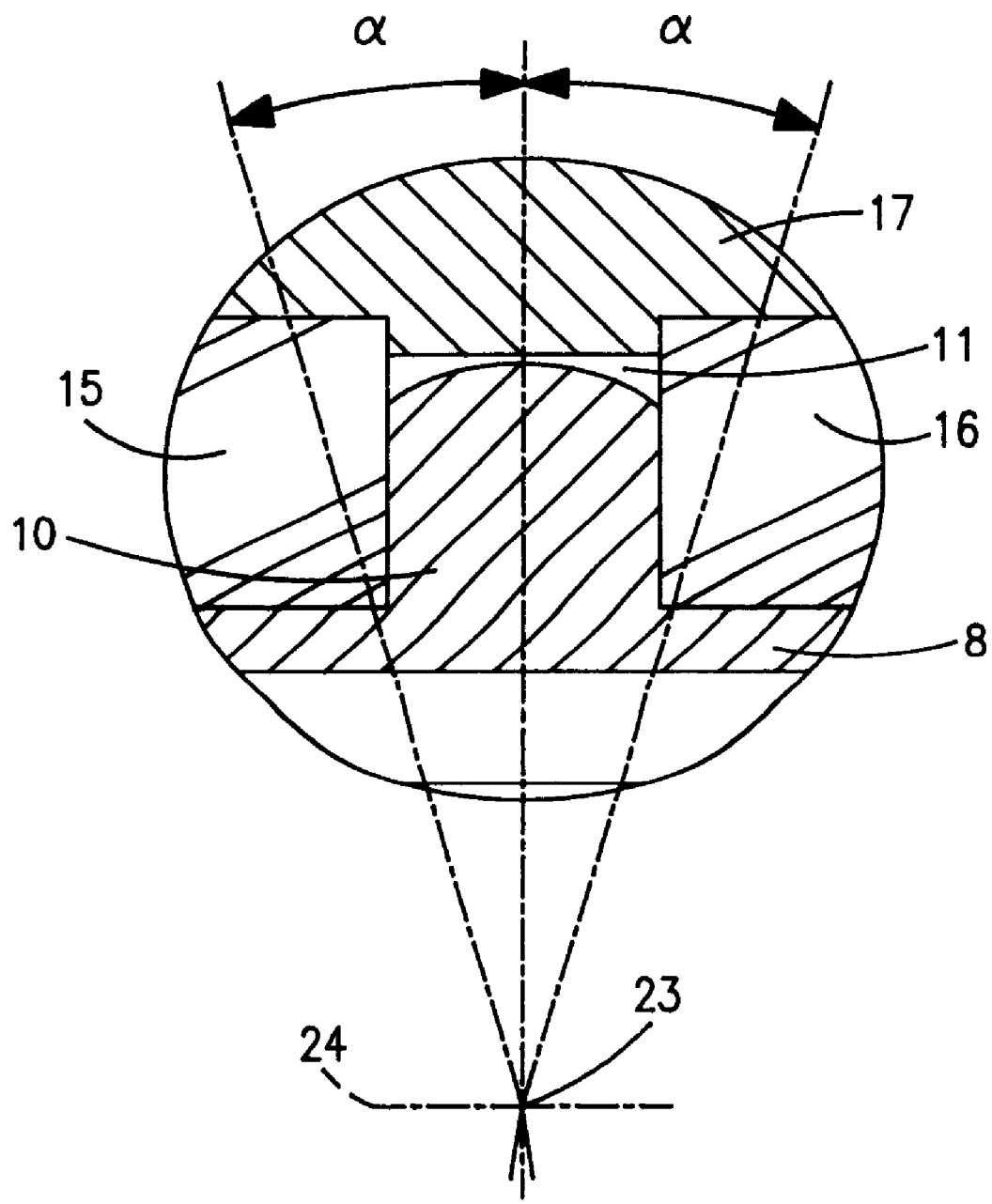
Figure 5:
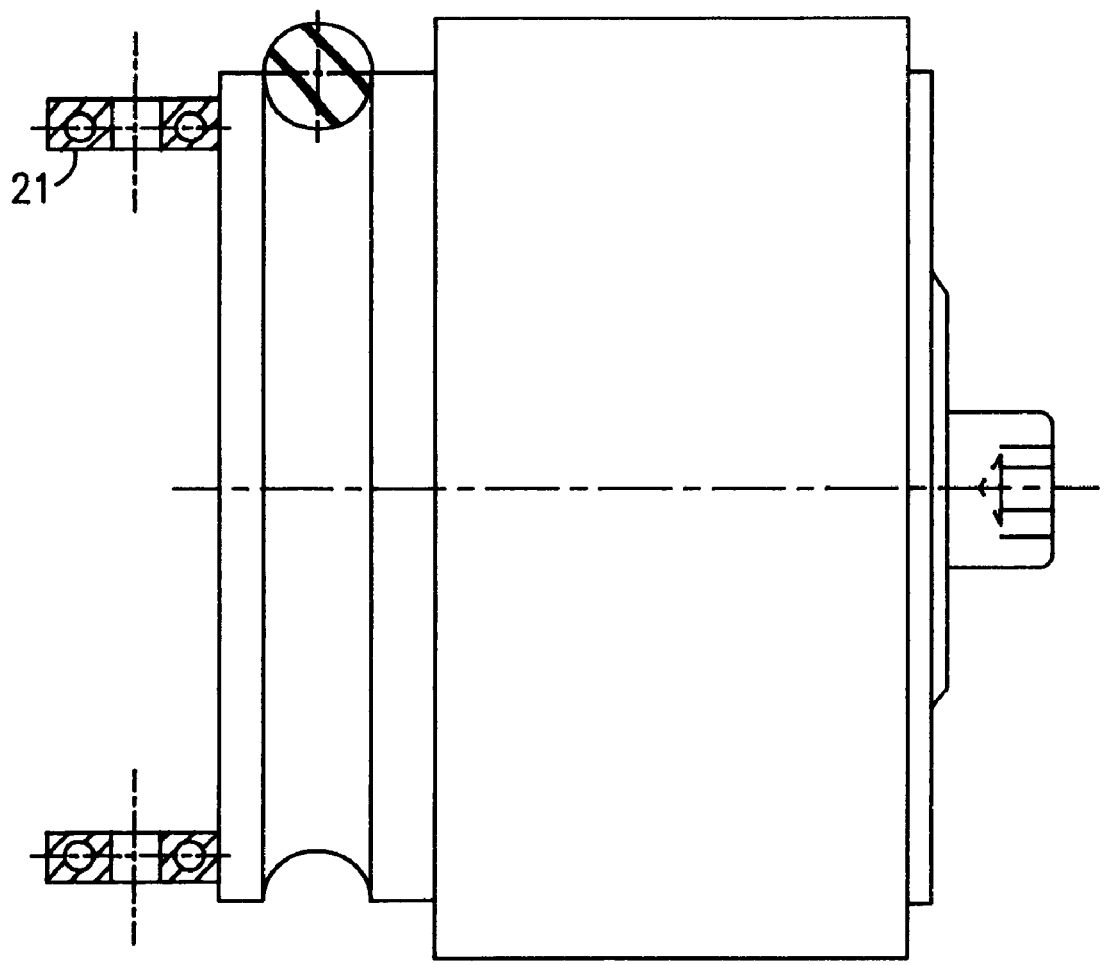
Figure 6:
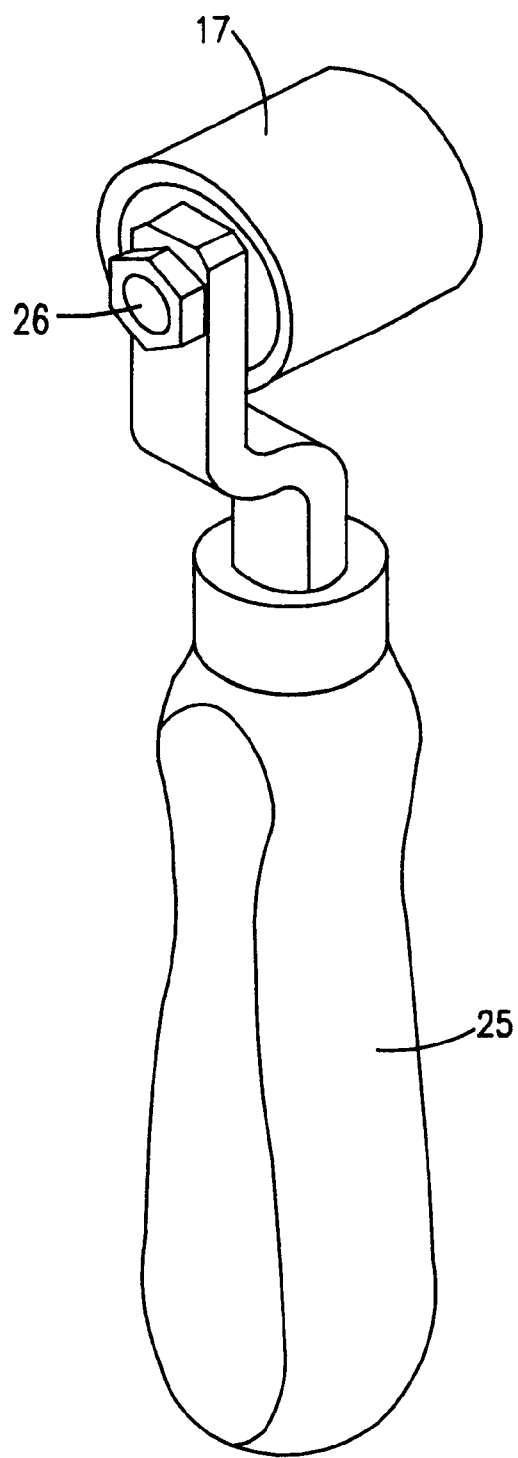

This invention is explained in greater detail below on the basis of embodiments:

The figures show:

FIG. 1: the schematic diagram of an automatic welding machine;

FIG. 2: a sectional diagram through a pressing device on an automatic welding machine;

FIG. 3: a view of the end face of the press roll of the pressing device with a partial section through the entraining unit;

FIG. 4: an enlarged view of the entraining unit according to FIG. 2;

FIG. 5: a top view of the pressing device for the fusion welding sheeting according to FIG. 2 with a stabilization device without a running gear or drive axle; and FIG. 6: a manual press roll.

FIG. 1 shows a schematic diagram of a portable automatic welding machine 1 for waterproof sheeting with a drive unit arranged in the housing and with control devices. The automatic welding machine 1 also has a receptacle 2 for a welder (not shown) and with conveyor rolls 3 and at least one drive roll 4, which at the same time also functions as a pressing device.

FIG. 2 shows a sectional diagram of the arrangement of the drive roll 4 on the running gear 5 of the automatic welding machine shown in FIG. 1. Drive shaft 7 is rotatably mounted on the running gear 5 by a shaft bearing 6. It can be driven, for example, by a chain drive (not shown) inside the running gear. On the drive shaft 7 there is an entraining sleeve 8 connected to the shaft bearing 6, braced with drive shaft 7 by a spring wedge 9. Entraining sleeve 8 is provided with an internal crown gear 10 which engages in a form-fitting manner with a matching crown gear 11 on the press roll 4. To center the press roll 4 with rubber ring 12, which runs on the outside, with regard to the side walls of the press roll, an internal and external set ring 13, 14 and an internal and external rubber buffer ring 15, 16 are arranged on the entraining sleeve and are secured toward the inside with a locking ring 28. The internal set ring 13 and the internal rubber buffer ring 15 are placed on the entraining sleeve 8 before the latter is inserted. After inserting the entraining sleeve 8, the press roll 17 can be pushed onto it axially. Following this, the external rubber buffer ring 16 and the external set ring 14 are inserted and are then attached securely to the spring washer 18 and bolt 19 on drive shaft 7. Thus, the press roll 17 can be assembled easily and can also be replaced with one of a different width easily. As shown by the figure, press roll can then execute a pendulum movement relative to drive shaft 7 about a pivot axis which runs at a right angle out of the plane of the drawing and parallel to the end face of the drive shaft 7 through the mid point of rotation. Axis of rotation 24 is perpendicular to this end face.

With the embodiment illustrated in FIG. 2, the pressing device is designed as a drive roll 4 which is composed essentially of press roll 17 and the connection to the drive shaft 7. The pressing device, however, may also consist of a press roll 17 which is not designed as a drive roll at the same time. With this embodiment (not illustrated), the shaft 7 is not driven and the press roll 17 is merely entrained by a pendulum bearing.

The press roll 17 in this embodiment is enlarged beyond the press surface formed by rubber ring 12 on the floor 27, to accommodate the part of the running gear 5 comprising the shaft bearing 6 in the end recess and accommodate a round belt 20 around the circumference for driving additional units.

FIG. 3 shows the drive roll 4 with the press roll 17 from another view, where teeth 10, 11 can be seen clearly. To achieve the result that press roll 17 always remains parallel to the running gear 5, pivot point supports 21 in the form of ball bearings that press against the end face 22 of the press roll 17 are provided on the running gear.

FIG. 4 shows an enlarged diagram of pendulum angle α about which the press roll 17 can move with respect to the rotation point 23 on the axis of rotation 24. This figure shows that the teeth 10 which are mounted on the entraining sleeve 8 are designed with a curvature. Consequently, the press roll can swing by the angle α about a pivot axis running through rotation point 23 perpendicular to the plane of the drawing, and it is braked at the side and supported elastically by the internal rubber buffer 15 and external rubber buffer 16.

FIG. 5 shows a top view of the rotational point supports 21 which press against the end face of the press roll 17.

FIG. 6 shows a manual press roll 25 where the press roll 17 is designed accordingly with regard to the connection to shaft 26 so that an optimum application of force is achieved even with an oblique direction of application of force with a manual welder where pressure must be applied by hand following the welding operation.

What is claimed is:

1. An automatic welding machine for waterproof sheeting with a running gear and a welder mounted thereon, conveyor rolls, a drive unit and pressing devices for lap-welded materials, where the pressing devices have at least one press roll which is mounted on a shaft and has an elastic sheathing on a circumference thereof that serves as a press surface for a contact surface of the material and presses the fusion welding sheeting from above due to the weight of the automatic welding machine, wherein the shaft (7) is mounted on the running gear (5) at one end;

the press roll (17) is mounted by means of a pendulum bearing (10, 11) on the shaft (7), which is arranged so it is centered with respect to the outside edges of the press surface and permits an additional pendulum motion of the press roll with respect to the shaft in that it can be pivoted about a pivot axis that intersects the axis of rotation (24) at the mid point (23) of rotation and runs parallel to the end face of the shaft;

elastic centering means (15, 16) are arranged on the shaft (7) on both sides of the pendulum bearing (10, 11); and a stabilization device (21) is arranged between the running gear (5) and the end face of the press roll (17) to guide the press roll (17) parallel to the running gear.

2. An automatic welding machine for waterproof sheeting according to claim 1, wherein elastic centering means (15, 16) are held on one end face by a spring washer (18) and a bolt (19) which secures the spring washer on the shaft (7).

3. An automatic welding machine for waterproof sheeting according to claim 1, wherein the shaft (7) is designed so that it can be driven and it has an entraining sleeve (8) which is connected in a form-fitting manner to the shaft (7) and has an entraining unit (10) with a pendulum rolling behavior on the circumference.

4. An automatic welding machine for waterproof sheeting according to claim 3, wherein the entraining unit (10, 11) has an internal crown gear (10) connected to the shaft (7) and an external crown gear (11) connected to the press roll (17), where at least the teeth of one crown gear (10) are designed with a curvature.

5. A pressing device for pressing lap-welded materials by exerting the required pressure on the fusion welding sheeting from above using at least one press roll which is mounted on a shaft by at least one side holder, and having an elastic sheathing on a circumference thereof that serves as the press surface on a contact surface of the material, wherein the shaft (7) is held at one end thereof;

the press roll (17) is mounted by means of a pendulum bearing (10, 11) on the shaft (7) which is arranged centrally with the outside edges of the press surface and permits an additional pendulum movement of the press roll with respect to the shaft, in that it can be pivoted about a pivot axis that intersects the axis of rotation (24) at the mid point (23) of rotation and runs parallel to the end face of the shaft; and elastic centering means (15, 16) are arranged on the shaft (7) on both sides of the pendulum mount (10, 11).

6. A pressing device according to claim 5, wherein the elastic centering means (15, 16) are held at least on one end by a spring washer (18) and by a bolt (19) that secures the spring washer on the shaft (7).

* * * * *